（12) United States Patent
Umeda et al.

(10) Patent No.: US 7,843,709 B2
(45) Date of Patent: Nov. 30, 2010

(54) RECTIFIER CIRCUIT AND RADIO COMMUNICATION DEVICE USING THE SAME

(75) Inventors: Toshiyuki Umeda, Tokyo (JP); Shoji Otaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 11/687,082

(22) Filed: Mar. 16, 2007

(65) Prior Publication Data
US 2008/0080214 A1 Apr. 3, 2008

(30) Foreign Application Priority Data
Sep. 28, 2006 (JP) .............................. 2006-265026

(51) Int. Cl.
*H02M 1/14* (2006.01)
(52) U.S. Cl. .............................. 363/44; 363/48; 363/52; 363/67; 363/81; 363/84
(58) Field of Classification Search .................. 323/37, 323/21.06, 44, 48, 52, 53, 61, 67, 68, 69, 323/70, 81, 84, 86, 108, 125; 307/54, 58, 307/63, 82
See application file for complete search history.

(56) References Cited
U.S. PATENT DOCUMENTS
5,111,014 A * 5/1992 Tanaka et al. ................ 219/626

2005/0282505 A1 12/2005 Umeda et al.
2006/0128345 A1 6/2006 Ootaka et al.
2008/0130338 A1* 6/2008 DeVilbiss ................... 363/127
2008/0259665 A1* 10/2008 Brederlow et al. ........... 363/127

FOREIGN PATENT DOCUMENTS

| CN | 1377466 | 10/2002 |
|---|---|---|
| JP | 2003-506948 | 2/2003 |
| JP | 2005-535213 | 11/2005 |
| JP | 2006-034085 | 2/2006 |
| JP | 2006-166415 | 6/2006 |

OTHER PUBLICATIONS

Japanese Office Action mailed Nov. 5, 2008 corresponding to U.S. Appl. No. 11/687,082, filed on Mar. 16, 2007.
Chinese Office Action mailed Mar. 27, 2009 corresponding to U.S. Appl. No. 11/687,082, filed on Mar. 16, 2007.
Nakamoto et al, A Passive UHF RFID Tag LSI with 36.6% Efficiency CMOS-Only Rectifier and Current-Mode Demodulator in 0.35um FeRAM Technology, ISSCC 2006, Session 17, Digest of Technical Papers, pp. 310-311.

* cited by examiner

*Primary Examiner*—Bao Q Vu
*Assistant Examiner*—Nguyen Tran
(74) *Attorney, Agent, or Firm*—Turocy & Watson, LLP

(57) ABSTRACT

A rectifier circuit includes an input terminal that receives an alternating-current signal, a first rectifier circuit that generates a first direct-current voltage from the alternating-current signal, a bias-voltage generating circuit that generates a bias voltage from the first direct-current voltage, and a second rectifier circuit that generates a second direct-current voltage from the alternating-current signal biased with the bias voltage.

6 Claims, 8 Drawing Sheets

RECTIFIER CIRCUIT AND RADIO COMMUNICATION DEVICE USING THE SAME

CROSS-REFERENCE TO RELATED APPLICATIONS

This application is based upon and claims the benefit of priority from the prior Japanese Patent Application No. 2006-265026, filed on Sep. 28, 2006; the entire contents of which are incorporated herein by reference.

BACKGROUND OF THE INVENTION

1. Field of the Invention

The present invention relates to a rectifier circuit that enables to generate a direct-current voltage from high-frequency low-intensity radio waves and a radio communication device that includes the rectifier circuit.

2. Description of the Related Art

Radio Frequency Identification (RFID) has been attracting attention as a technology for identification and management of human beings or objects. An RFID tag is cited as a representative example of the RFID technology, i.e., a non-contact authentication technology. A typical RFID tag includes a tiny radio-frequency integrated circuits (IC) chip and an antenna. The RFID tag receives high-frequency radio waves transmitted from a base station, so-called "a reader/writer", via the antenna, and generates a direct-current voltage from an alternating current that is induced from the high-frequency radio waves at the antenna. Specifically, the direct-current voltage is generated by a rectifier circuit included in the RFID tag, and the generated voltage is used not only as a power supply voltage of the RFID tag but also as a communication signal.

The rectifier circuit is generally composed of a diode-connected metal-oxide-semiconductor (MOS) transistor. In a typical diode-connected MOS transistor, a gate and a drain of the MOS transistor are directly connected to each other. The rectifier circuit rectifies an effective value of an alternating-current signal exceeding a threshold voltage of the MOS transistor to a direct-current signal. In other words, based on the alternating-current signal below the threshold voltage, the rectifier circuit cannot generate a direct-current signal. On the other hand, even when the effective value of the alternating-current signal exceeds the threshold voltage, if a difference between the effective value and the threshold voltage is small, the rectification efficiency becomes low. This is because a rectifying object of the rectifier circuit is restricted to the alternating-current component obtained by subtracting the threshold voltage from the alternating-current signal.

To solve the problem, JP-A 2006-34085 (KOKAI) discloses a high-sensitive rectifier circuit. In a MOS transistor of the disclosed high-sensitive rectifier circuit, a drain and a gate are connected to each other via a capacitor. The capacitor holds a voltage approximately equivalent to a threshold voltage of the MOS transistor. Therefore, even if an effective value of an alternating-current signal is below the threshold voltage, the high-sensitive rectifier circuit can rectify the alternating-current signal to a direct-current signal.

However, if a charge leak occurs in the MOS transistor for voltage supply, voltages at both ends of the capacitor between the drain and the gate may gradually decrease. In other words, the rectification efficiency may decrease with the passage of time. Even if voltages are transferred from a plurality of capacitors to the capacitor between the drain and the gate by a switching circuit, voltages at both ends of each capacitor may also decrease. To solve the problem, a refresh operation is performed on the capacitor between the drain and the gate. Namely, a voltage is applied to the capacitor at regular intervals. The refresh operation can be performed by using a bias-voltage generating circuit and a pulse generating circuit. Therefore, an external power source such as a battery is required for running the bias-voltage generating circuit and the pulse generating circuit constantly.

As a result, a production cost and a size of the device increase because the external power source is built in the rectifier circuit. Moreover, an enough capacity design is required in consideration of continuous operating time of the circuits.

SUMMARY OF THE INVENTION

According to one aspect of the present invention, a rectifier circuit includes an input terminal that receives an alternating-current signal; a first rectifier circuit that generates a first direct-current voltage from the alternating-current signal; a bias-voltage generating circuit that generates a bias voltage from the first direct-current voltage; and a second rectifier circuit that generates a second direct-current voltage from the alternating-current signal biased with the bias voltage.

According to another aspect of the present invention, a radio communication device contains a rectifier circuit that includes an input terminal that receives an alternating-current signal; a first rectifier circuit that generates a first direct-current voltage from the alternating-current signal; a bias-voltage generating circuit that generates a bias voltage from the first direct-current voltage; and a second rectifier circuit that generates a second direct-current voltage from the alternating-current signal biased with the bias voltage; an antenna that is connected to the input terminal; and a signal processing circuit that receives the second direct-current voltage as a power supply voltage and demodulates the second direct-current voltage thereby obtaining a communication signal.

DETAILED DESCRIPTION OF THE INVENTION

Exemplary embodiments of the present invention are explained in detail below with reference to the accompanying drawings.

A rectifier circuit according to a first embodiment includes a general first rectifier circuit, a high-sensitive second rectifier circuit, a pulse generating circuit, and a bias-voltage generating circuit. The first rectifier circuit generates a first direct-current voltage from low-intensity radio waves. The pulse generating circuit and the bias-voltage generating circuit are driven by the first direct-current voltage, and respectively output a pulse signal and a bias voltage to the second rectifier circuit. The second rectifier circuit is driven by the pulse signal and the bias voltage, and generates a second direct-current voltage from the low-intensity radio waves. Namely, the first rectifier circuit activates the pulse generating circuit and the bias-voltage generating circuit, and the pulse generating circuit and the bias-voltage generating circuit activate the second rectifier circuit. Therefore, the second rectifier circuit can be maintained in a high-sensitive condition without using an external power source such as a battery.

Figure 1:
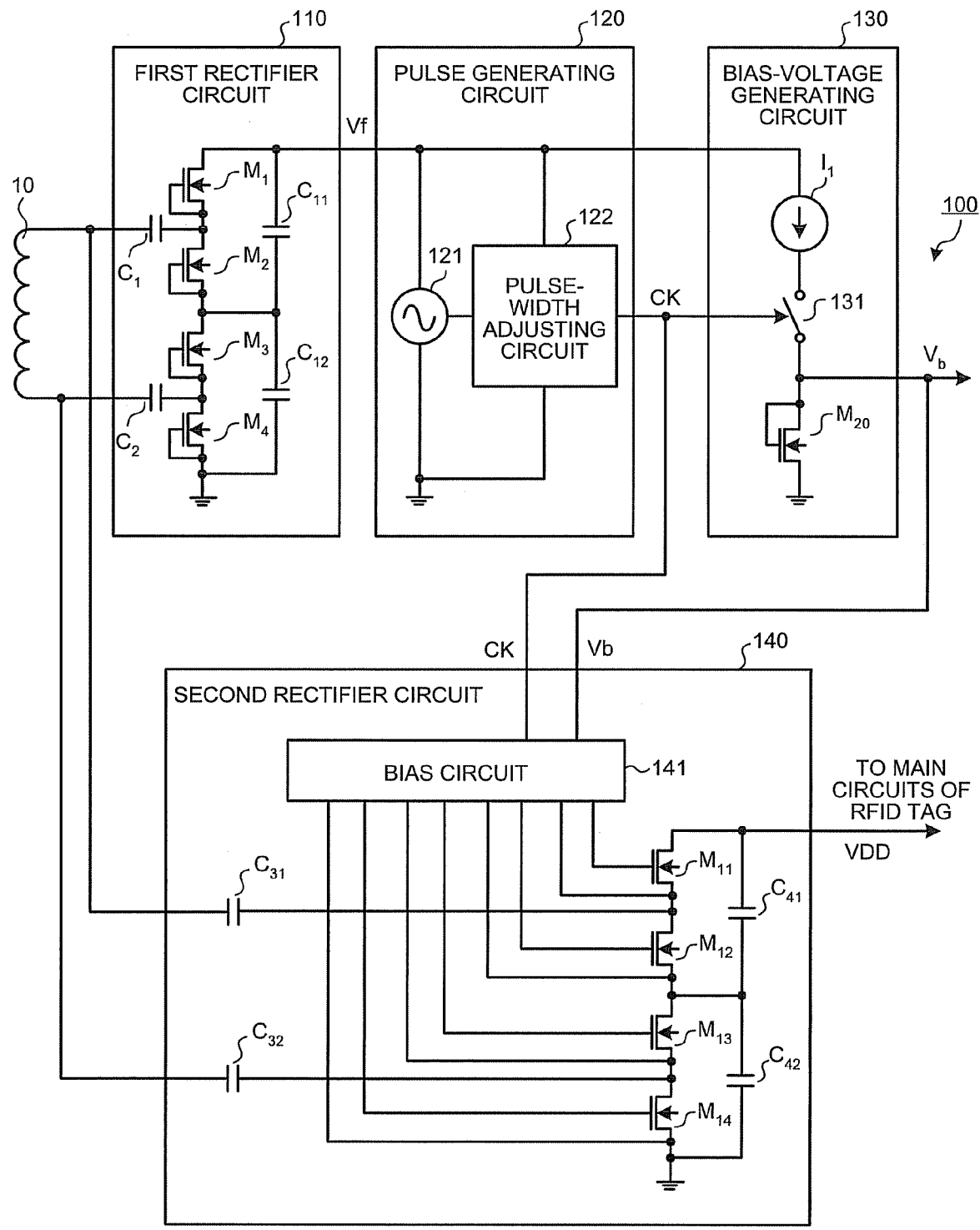
FIG. 1 is a block diagram of a rectifier circuit according to a first embodiment of the present invention.

As shown in FIG. 1, the rectifier circuit 100 includes a first rectifier circuit 110, a pulse generating circuit 120, a bias-voltage generating circuit 130, and a second rectifier circuit 140. The first rectifier circuit 110 includes four n-channel metal-oxide-semiconductor (NMOS) transistors $M_1$ to $M_4$ that are arranged in cascade. A gate and a drain are directly connected to each other in each of the NMOS transistors $M_1$ to $M_4$. An end of a coupling capacitor $C_1$ is connected to a connection line between the adjacent NMOS transistors $M_1$ and $M_2$. Ends of a smoothing capacitor $C_{11}$ are respectively connected to a source of the NMOS transistor $M_1$ and a drain of the NMOS transistor $M_2$. An end of a coupling capacitor $C_2$ is connected to a connection line between the adjacent NMOS transistors $M_3$ and $M_4$. Ends of a smoothing capacitor $C_{12}$ are respectively connected to a source of the NMOS transistor $M_3$ and a drain of the NMOS transistor $M_4$. The drain of the NMOS transistor $M_4$ is earthed. The other ends of the coupling capacitors $C_1$ and $C_2$ are connected to an antenna 10 of, for example, a RFID tag. The coupling capacitors $C_1$ and $C_2$ receive a high-frequency alternating-current signal via the antenna 10.

As shown in FIG. 1, a configuration of the first rectifier circuit 110 is equivalent to the same for a conventional rectifier circuit. The first rectifier circuit 110 rectifies the alternating-current signal input from the coupling capacitors $C_1$ and $C_2$, and outputs a direct-current voltage $V_f$ via the source of the NMOS transistor $M_1$. The NMOS transistors $M_1$ to $M_4$ in the first rectifier circuit 110 are designed to have higher impedance matching to input loads, such as loads on the antenna 10, compared with the same for the second rectifier circuit 140. For example, a threshold voltage of the NMOS transistors $M_1$ to $M_4$ is set to be low, and also a gate width of each of the NMOS transistors $M_1$ to $M_4$ is designed to be narrow. Therefore, the NMOS transistors $M_1$ to $M_4$ have high input impedance. Specifically, each component area of the NMOS transistors $M_1$ to $M_4$ is smaller than the same for NMOS transistors in the second rectifier circuit 140. For example, the each component area of the NMOS transistors $M_1$ to $M_4$ is smaller than one third of the same for the NMOS transistors in the second rectifier circuit 140. In the result, the NMOS transistors $M_1$ to $M_4$ can generate a minimum amount of the direct-current voltage $V_f$ (for example, 0.5 volt) enough to drive the pulse generating circuit 120 and the bias-voltage generating circuit 130 from an effective value of the alternating-current signal (for example, approximately 0.2 volt) that is smaller than the same required for a standard rectifier circuit.

The pulse generating circuit 120 includes an oscillator 121 and a pulse-width adjusting circuit 122. The oscillator 121 is driven by the direct-current voltage $V_f$ that is generated in the first rectifier circuit 110. The oscillator 121 outputs a predetermined frequency level of signals to the pulse-width adjusting circuit 122. The pulse-width adjusting circuit 122 generates clock signals CK from the predetermined frequency level of the signals. The clock signals CK denote a repetition of periodical pulse signals in which a duration of a logical level "H" is shorter than the same for a logical level "L", i.e., a duty ratio is less than 50%.

The bias-voltage generating circuit 130 generates a bias voltage $V_b$ from the direct-current voltage $V_f$ generated in the first rectifier circuit 110 and the clock signals CK output from the pulse generating circuit 120. The bias-voltage generating circuit 130 includes a current source $I_1$, a switch 131, and an NMOS transistor $M_{20}$. The current source $I_1$, the switch 131, and the NMOS transistor $M_{20}$ are series-connected in that order. Specifically, an input terminal of the current source $I_1$ is connected to an output terminal of the first rectifier circuit 110 (i.e., a terminal to output the direct-current voltage $V_f$). An end of the switch 131 is connected to an output terminal of the current source $I_1$. The other end of the switch 131 is connected to a drain of the NMOS transistor $M_{20}$. A source of the NMOS transistor $M_{20}$ is earthed. The switch 131 is turned ON/OFF depending on the clock signals CK. The bias voltage $V_b$ is set to be below and preferably proximate to a threshold voltage of NMOS transistors of the second rectifier circuit 140.

The pulse generating circuit 120 and the bias-voltage generating circuit 130 can be composed by complementary metal-oxide-semiconductor (CMOS) circuits or passive components. An oscillation frequency of signals input to the pulse generating circuit 120 and the bias-voltage generating circuit 130 is in the approximately kilohertz band. Namely, the pulse generating circuit 120 and the bias-voltage generating circuit 130 rarely consume currents. Therefore, the pulse generating circuit 120 and the bias-voltage generating circuit 130 can be operated by the weak direct-current voltage $V_f$ generated in the first rectifier circuit 110.

The second rectifier circuit 140 includes a rectifying unit and a bias circuit 141. The rectifying unit includes four NMOS transistors $M_{11}$ to $M_{14}$ that are arranged in cascade, two coupling capacitors $C_{31}$ and $C_{32}$, and two smoothing capacitors $C_{41}$ and $C_{42}$. An end of the coupling capacitor $C_{31}$ is connected to a connection line between the adjacent NMOS transistors $M_{11}$ and $M_{12}$. Ends of the smoothing capacitor $C_{41}$ are respectively connected to a source of the NMOS transistor $M_{11}$ and a drain of the NMOS transistor $M_{12}$. An end of the coupling capacitor $C_{32}$ is connected to a connection line between the adjacent NMOS transistors $M_{13}$ and $M_{14}$. Ends of the smoothing capacitor $C_{42}$ are respectively connected to a source of the NMOS transistor $M_{13}$ and a drain of the NMOS transistor $M_{14}$. The drain of the NMOS transistor $M_{14}$ is earthed. A direct-current voltage $V_{DD}$ is output from the source of the NMOS transistor $M_{11}$. The other ends of the coupling capacitors $C_{31}$ and $C_{32}$ are respectively connected to the other ends of the coupling capacitors $C_1$ and $C_2$ in the first rectifier circuit 110. Namely, the alternating-current signal that is input to the first rectifier circuit 110 is also input to the rectifying unit in the second rectifier circuit 140.

Each of gates and drains of the NMOS transistors $M_{11}$ to $M_{14}$ is connected to the bias circuit 141. The bias voltage $V_b$, is applied to between the gate and the drain of each of the NMOS transistors $M_{11}$ to $M_{14}$ via the bias circuit 141. The NMOS transistors $M_{11}$ to $M_{14}$ can be designed in the same manner as the NMOS transistor $M_{20}$ (for example, the same width and length of the gate, the same threshold voltage, and the like).

Figure 2:
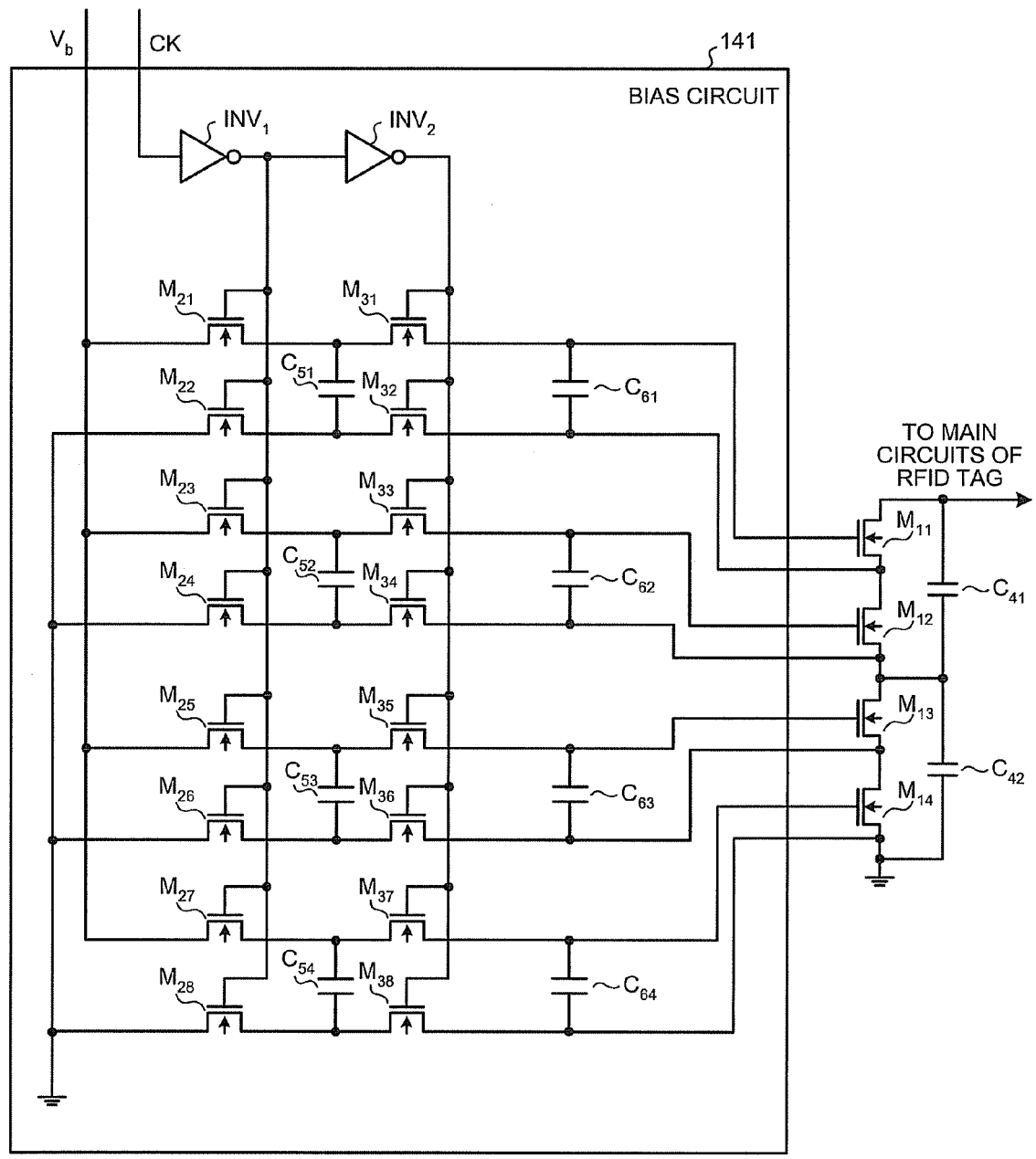
FIG. 2 is a circuit diagram of a bias circuit included in the rectifier circuit.

As shown in FIG. 2, the bias circuit 141 includes two inverters $INV_1$ and $INV_2$, four (first to fourth) switching blocks that are respectively assigned to the NMOS transistors $M_{11}$ to $M_{14}$ in the rectifying unit. The first switching block, which is connected to between the gate and the drain of the NMOS transistors $M_{11}$, includes four NMOS transistors $M_{21}$, $M_{22}$, $M_{31}$, and $M_{32}$ as transfer gates, and two capacitors $C_{51}$ and $C_{61}$. The second switching block, which is connected to between the gate and the drain of the NMOS transistor $M_{12}$, includes four NMOS transistors $M_{23}$, $M_{24}$, $M_{33}$, and $M_{34}$, and two capacitors $C_{52}$ and $C_{62}$. The third switching block, which is connected to between the gate and the drain of the NMOS transistor $M_{13}$, includes four NMOS transistors $M_{25}$, $M_{26}$, $M_{35}$, and $M_{36}$, and two capacitors $C_{53}$ and $C_{63}$. The fourth switching block, which is connected to between the gate and the drain of the NMOS transistor $M_{14}$, includes four NMOS transistors $M_{27}$, $M_{28}$, $M_{37}$, and $M_{38}$, and two capacitors $C_{54}$ and $C_{64}$. The first to fourth switching blocks have the same configuration and the same operational parameters. Therefore, of the four switching blocks, the first switching block is described in detail below.

A drain of the NMOS transistor $M_{21}$ is connected to a source of the NMOS transistor $M_{31}$. A source of the NMOS transistor $M_{21}$ is connected to a supply line of the bias voltage $V_b$ that is generated by the bias-voltage generating circuit 130. A drain of the NMOS transistor $M_{31}$ is connected to the gate of the NMOS transistor $M_{11}$. A drain of the NMOS transistor $M_{22}$ is connected to a source of the NMOS transistor $M_{32}$. A source of the NMOS transistor $M_{22}$ is earthed. A drain of the NMOS transistor $M_{32}$ is connected to the drain of the NMOS transistor $M_{11}$. Gates of the NMOS transistors $M_{21}$ and $M_{22}$ are connected to an output terminal of the inverter $INV_1$. Gates of the NMOS transistors $M_{31}$ and $M_{32}$ are connected to an output terminal of the inverter $INV_2$. The capacitor $C_{51}$ is connected to between the drains of the NMOS transistors $M_{21}$ and $M_{22}$. The capacitor $C_{61}$ is connected to between the drains of the NMOS transistors $M_{31}$ and $M_{32}$. The direct-current voltage $V_{DD}$ generated by the second rectifier circuit 140 is used as a main power supply of other main circuits included in a Radio Frequency Identification (RFID) tag such as a signal-processing circuit. Therefore, a gate width of each of the NMOS transistors $M_{11}$ to $M_{14}$ is designed to be relatively wide.

Each pair of transfer gates, the NMOS transistors $M_{21}$ and $M_{22}$ and the NMOS transistors $M_{31}$ and $M_{32}$, is complementarily turned ON/OFF depending on the clock signal CK. Then, the capacitors $C_{51}$ and $C_{61}$ are alternately charged repeatedly.

Specifically, when the clock signal CK is in the logical level "L", the inverter $INV_1$ outputs a signal of the logical level "H" and the inverter $INV_2$ outputs a signal of the logical level "L". Upon receiving the signals, the NMOS transistors $M_{21}$ and $M_{22}$ are turned ON. Then, the capacitor $C_{51}$ is charged until voltages of both ends of the capacitor $C_{51}$ rise approximately equivalent to the bias voltage $V_b$. While the NMOS transistors $M_{21}$ and $M_{22}$ are turned ON, the NMOS transistors $M_{31}$ and $M_{32}$ are turned OFF. Therefore, the capacitor $C_{61}$ is not charged. On the other hand, when the clock signal CK is in the logical level "H", the inverter $INV_1$ outputs a signal of the logical level "L" and the inverter $INV_2$ outputs a signal of the logical level "H". Upon receiving the signals, the NMOS transistors $M_{21}$ and $M_{22}$ are turned OFF, and the NMOS transistors $M_{31}$ and $M_{32}$ are turned ON. The capacitor $C_{61}$ is charged by a discharge from the capacitor $C_{51}$ until voltages of both ends of the capacitor $C_{61}$ rise approximately equivalent to the bias voltage $V_b$. Therefore, a voltage approximately equivalent to the threshold voltage is constantly applied to between the gate and the drain of the NMOS transistor $M_{11}$. In the same manner as in the NMOS transistor $M_{11}$, a voltage approximately equivalent to the threshold voltage is constantly applied to between the gate and the drain of each of the other NMOS transistors $M_{12}$ to $M_{14}$. Thus, the second rectifier circuit 140 is constantly maintained in the high-sensitive condition. In other words, the second rectifier circuit 140 can generate the direct-current voltage $V_{DD}$, which is larger than the direct-current voltage $V_f$, from a weak alternating-current signal.

Incidentally, the NMOS transistors $M_{11}$ to $M_{14}$ receive high-frequency signals that are in the gigahertz band. Therefore, it is necessary to minimize parasitic capacities of the NMOS transistors $M_{11}$ to $M_{14}$. On the other hand, the bias-voltage generating circuit 130 has relatively large capacity to stably generate the bias voltage $V_b$. Consequently, the bias circuit 141 is provided in the second rectifier circuit 140, so that the bias voltage $V_b$, output from the bias-voltage generating circuit 130 is not directly applied to between the gate and the drain of each of the NMOS transistors $M_{11}$ to $M_{14}$.

Figure 3:
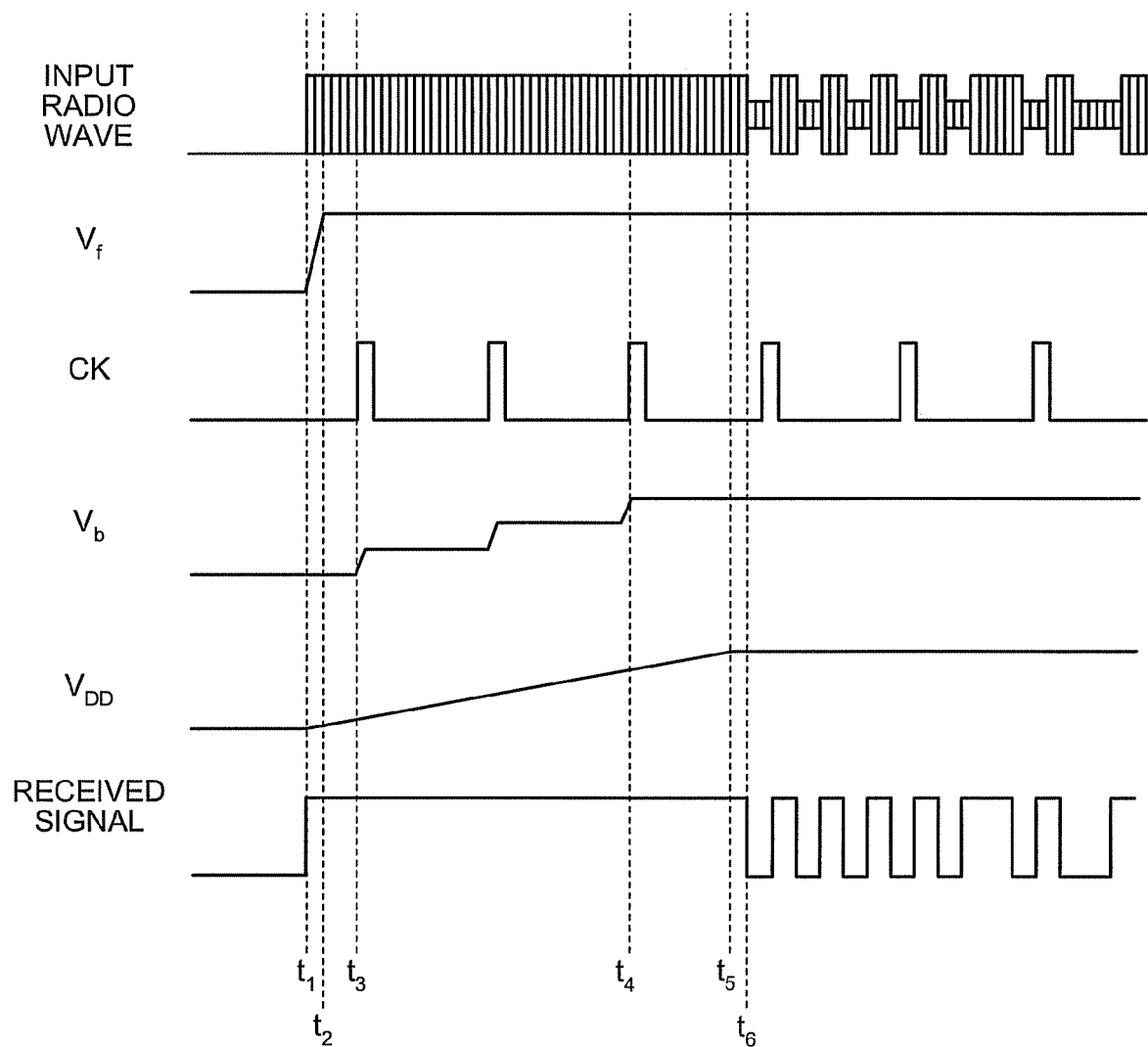
FIG. 3 is a timing chart of main signals transmitted through the rectifier circuit.

As shown in FIG. 3, "Input radio wave" denotes an alternating-current signal that is input to the first rectifier circuit 110 and the second rectifier circuit 140 via the antenna 10. "$V_f$" denotes a direct-current voltage $V_f$ output from the first rectifier circuit 110. "CK" denotes a clock signal CK output from the pulse generating circuit 120. "$V_b$" denotes a bias voltage $V_b$ output from the bias-voltage generating circuit 130. "$V_{DD}$" denotes a direct-current voltage $V_{DD}$ output from the second rectifier circuit 140.

Hereinafter, overall operation of the rectifier circuit 100 is explained with reference to FIG. 3. It is assumed that a radio wave is input to the rectifier circuit 100 for the first time at a timing $t_1$. At the timing $t_1$, the rectifier circuit 100 is in the initial condition. Therefore, the capacitors $C_{61}$ to $C_{64}$ of the bias circuit 141 are not charged yet, and a potential difference between the gate and the drain of each of the NMOS transistors $M_{11}$ to $M_{14}$ is still zero. Namely, the second rectifier circuit 140 is not in the high-sensitive condition. If the input radio waves possess considerable energy, and also if an effective value of an alternating-current signal, which the input radio waves are induced thereto by the antenna 10, sufficiently exceeds the threshold voltage of the NMOS transistors $M_{11}$ to $M_{14}$, the second rectifier circuit 140 can generate a direct-current voltage $V_{DD}$ from the alternating-current signal regardless of charging statuses of the capacitors $C_{61}$ to $C_{64}$. However, if the input radio waves are weak, and also if the effective value of the alternating-current signal is below the threshold voltage, the second rectifier circuit 140 has high input impedance because the second rectifier circuit 140 is not in the high-sensitive condition. Therefore, the alternating-current signal is reflected by the second rectifier circuit 140. On the other hand, the first rectifier circuit 110 has high impedance matching to the antenna 10. Therefore, the first rectifier circuit 110 can generate a direct-current voltage from an alternating-current signal even if the alternating-current signal is weak.

When the first rectifier circuit 110 receives a weak alternating-current signal, the smoothing capacitors $C_{11}$ and $C_{12}$ are charged. Then, at a timing $t_2$, the direct-current voltage $V_f$ reaches a predetermined voltage level required for the pulse generating circuit 120 and the bias-voltage generating circuit 130. The pulse generating circuit 120 is driven by the direct-current voltage $V_f$, and generates a clock signal CK.

A first pulse of the clock signal CK rises at a timing $t_3$. At the same timing, the switch 131 in the bias-voltage generating circuit 130 is turned ON, and the NMOS transistor $M_{20}$ is charged by the direct-current voltage $V_f$. Before voltages of both ends of the NMOS transistor $M_{20}$ reaches a target voltage level, the first pulse of the clock signal CK falls. Namely, the first pulse of the clock signal CK cannot cause the bias voltage $V_b$ to reach the target voltage level. Therefore, even when the bias circuit 141 receives the bias voltage $V_b$ and the first pulse of the clock signal CK, the second rectifier circuit 140 is not in the high-sensitive condition yet.

After a plurality of pulses of the clock signal CK is input to the bias-voltage generating circuit 130, the bias circuit 141 can receive the target voltage level of the bias voltage $V_b$ at a timing $t_4$. Then, the capacitors $C_{61}$ to $C_{64}$, which are respectively connected to between the gate and the drain of each of the NMOS transistors $M_{11}$ to $M_{14}$, are charged approximately equivalent to the threshold voltage. As a result, the second rectifier circuit 140 becomes in the high-sensitive condition. From the timing $t_4$ onward, the smoothing capacitors $C_{41}$ and $C_{42}$ are further charged. Then, a predetermined voltage level of the direct-current voltage $V_{DD}$ is output at a timing $t_5$. Namely, the second rectifier circuit 140 can be ready to generate the direct-current voltage $V_{DD}$ from weak radio waves.

During the timings $t_1$ to $t_5$, the second rectifier circuit 140 slightly rectifies weak alternating-current signals that are input to the coupling capacitors $C_{31}$ and $C_{32}$, and the smoothing capacitors $C_{41}$ and $C_{42}$ accumulate electric charges gradually. The electric charges are also output as the direct-current voltage $V_{DD}$.

When the rectifier circuit 100 is built into the RFID tag, the direct-current voltage $V_{DD}$ generated by the second rectifier circuit 140 is supplied to main circuits such as the signal processing circuit. For example, at a timing $t_6$, a communication-signal requesting signal is transmitted to the reader/writer by modulating electric currents that permeate the antenna 10. Upon receiving the communication signal as radio waves, the rectifier circuit 100 rectifies a radio waves-induced alternating-current signal in the second rectifier circuit 140. Then, the rectifier circuit 100 outputs a direct-current voltage $V_{DD}$ including communication information to the signal processing circuit.

As described above, the rectifier circuit 100 according to the first embodiment needs not include an external power source such as a battery. Moreover, the rectifier circuit 100 can stably generate an enough level of the direct-current voltage by rectifying an alternating-current signal, even if an effective value of the alternating-current signal is below the threshold voltage of the MOS transistor included in the rectifying unit. Incidentally, the rectifier circuit 100 can minimize not only its size but also the production cost because it is not necessary to include the external power source and a capacity for the external power source.

A rectifier circuit 200 according to a second embodiment can save power consumption by operating a second rectifier circuit 240 when the bias voltage $V_b$ output from the bias-voltage generating circuit 130 meets a predetermined condition.

Figure 4:
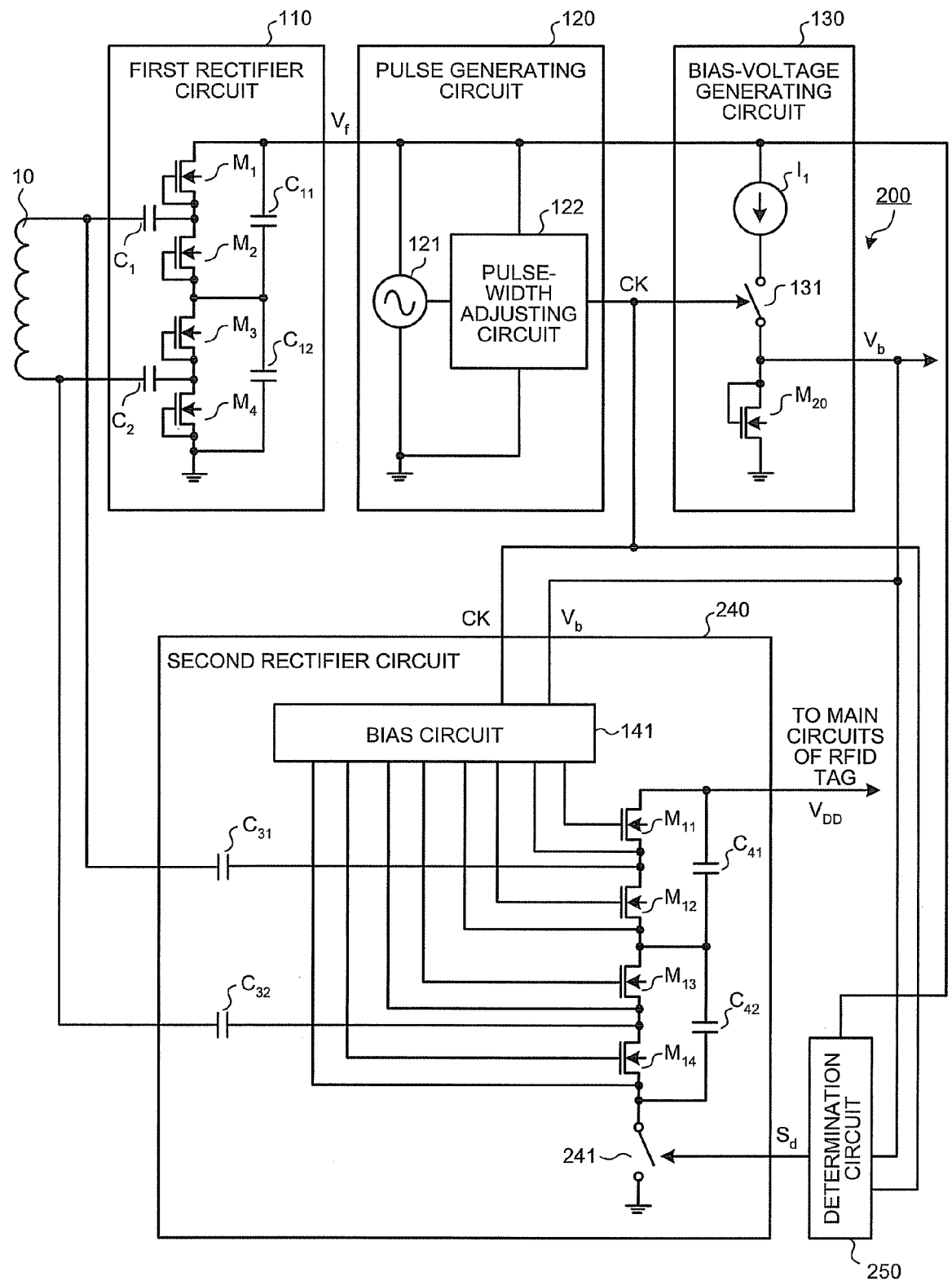
FIG. 4 is a block diagram of a rectifier circuit according to a second embodiment of the present invention.

FIG. 4 is a block diagram of the rectifier circuit 200. The portions identical to those in FIG. 1 are denoted with the same reference numerals and the description of those portions is omitted. The rectifier circuit 200 further includes a determination circuit 250 and the second rectifier circuit 240 instead of the second rectifier circuit 140 in the rectifier circuit 100.

The determination circuit 250 is driven by the direct-current voltage $V_f$ output from the first rectifier circuit 110. When the bias voltage $V_b$ output from the bias-voltage generating circuit 130 meets a predetermined condition, the determination circuit 250 outputs a control signal $S_d$ that indicates ON. As an example of the predetermined condition, when the bias voltage $V_b$ coincides with voltages of both ends of the capacitor $C_{61}$, the determination circuit 250 outputs the control signal $S_d$. Incidentally, if a difference between the voltages of the both ends is below a threshold, or if the bias voltage $V_b$ exceeds a predetermined voltage level Vth, the bias voltage $V_b$ is deemed to coincide with the voltages of the both ends of the capacitor $C_{61}$.

The second rectifier circuit 240 is different from the second rectifier circuit 140 in the following point. The second rectifier circuit 240 further includes a switch 241 that is arranged between the second rectifier circuit 240 and an earth terminal. Other components of the second rectifier circuit 240 are identical to those in the second rectifier circuit 140. The switch 241 is turned ON/OFF depending on the control signal $S_d$. Specifically, when the control signal $S_d$ indicates ON, the second rectifier circuit 240 is conducted to the earth terminal. The switch 241 can be arranged wherever the switch 241 causes the second rectifier circuit 240 to be driven. For example, the switch 241 can be arranged between the antenna 10 and the coupling capacitors $C_{31}$ and $C_{32}$.

Figure 5:
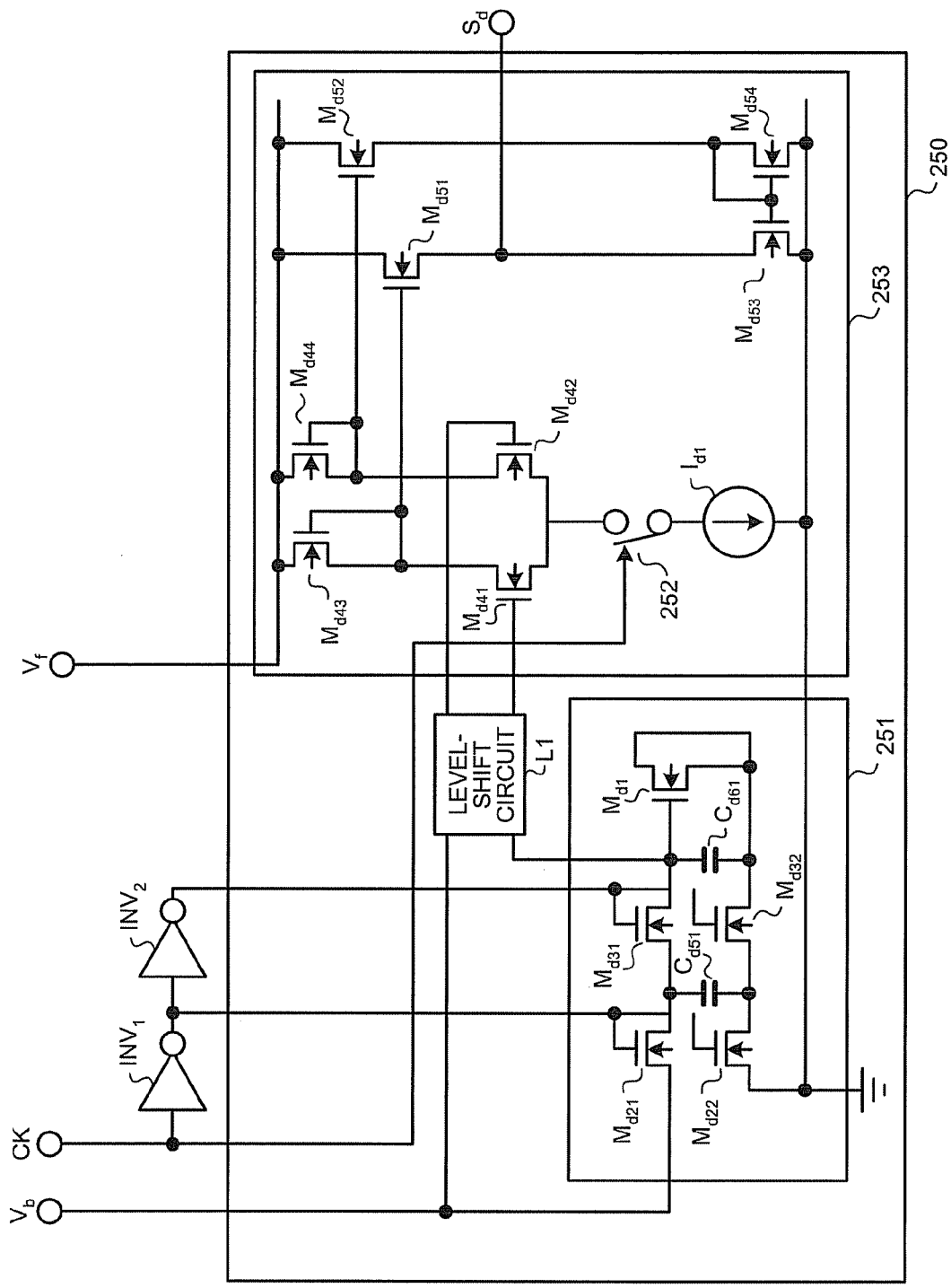
FIG. 5 is a circuit diagram of a determination circuit included in the rectifier circuit according to the second embodiment.

As shown in FIG. 5, the determination circuit 250 includes a dummy bias circuit 251, a comparison circuit 253, and a level-shift circuit $L_1$. The dummy bias circuit 251 includes transistors $M_{d1}$, $M_{d21}$, $M_{d22}$, $M_{d31}$, and $M_{d32}$ and capacitors $C_{d51}$ and $C_{d61}$. The comparison circuit 253 includes transistors $M_{d41}$ to $M_{d44}$ and $M_{d51}$ to $M_{d54}$, a switch 252, and a constant current source $I_{d1}$.

Each pair of the transistors $M_{d1}$ and $M_{11}$, the transistors $M_{d21}$ and $M_{21}$, the transistors $M_{d22}$ and $M_{22}$, the transistors $M_{d31}$ and $M_{31}$, and the transistors $M_{d32}$ and $M_{32}$ has the same configuration respectively. Each pair of the capacitors $C_{d51}$ and $C_{51}$, and the capacitors $C_{d61}$ and $C_{61}$ has the same configuration respectively.

The bias voltage $V_b$ is supplied to a source of the transistor $M_{d21}$. The clock signal CK is input to gates of the transistors $M_{d21}$ and $M_{d22}$ via the inverter $INV_1$. The clock signal CK is input to gates of the transistors $M_{d31}$ and $M_{d32}$ via the inverters $INV_1$ and $INV_2$.

A voltage of the gate of the transistor $M_{d1}$ that is level-shifted by the level-shift circuit $L_1$ is applied to a gate of the transistor $M_{d41}$. The bias voltage $V_b$ is level-shifted by the level-shift circuit $L_1$, and applied to a gate of the transistor $M_{d42}$. The transistors $M_{d41}$ and $M_{d42}$ form a differential amplifier circuit, and sources of the transistors $M_{d41}$ and $M_{d42}$ are connected to the constant current source $I_{d1}$ via the switch 252.

Each pair of the transistors $M_{d43}$ and $M_{d51}$ and the transistors $M_{d44}$ and $M_{d52}$ respectively forms a current mirror circuit. Currents output from drains of the transistors $M_{d41}$ and $M_{d42}$ are respectively shifted into currents output from drains of the transistors $M_{d51}$ and $M_{d52}$. A pair of the transistors $M_{d53}$ and $M_{d54}$ also forms a current mirror circuit. A current output from a drain of the transistor $M_{d52}$ is shifted into a current output from a drain of the transistor $M_{d53}$. The transistors $M_{d51}$ and $M_{d53}$ mutually share the drain. A control signal $S_d$ that indicates a voltage of the drain is output via the drain.

When the switch 252 is just turned ON, the capacitor $C_{d61}$ is not charged yet. Therefore, a gate voltage of the transistor $M_{d41}$ is lower than the same for the transistor $M_{d42}$. At the time, currents seldom flow through the transistor $M_{d51}$, but most of currents flow through the transistor $M_{d52}$. As a result, the transistor $M_{d53}$ is turned ON, and does not output the control signal $S_d$.

When the capacitor $C_{d61}$ is charged and voltages of both ends of the capacitor $C_{d61}$ reaches approximately equivalent to the bias voltage $V_b$, gate voltages of the transistors $M_{d41}$ and $M_{d42}$ become an approximately equal voltage level.

Therefore, currents almost equally flow though the transistors $M_{d51}$ and $M_{d52}$. As a result, the transistor $M_{d51}$ is turned ON, and outputs the control signal $S_d$.

When a voltage of the capacitor $C_{d61}$ is equal to the bias voltage $V_b$ by providing an appropriate level of offset voltage to the level-shift circuit $L_1$, a gate voltage of the transistor $M_{d41}$ is set to be larger than the same for the transistor $M_{d42}$. Therefore, an output level of the control signal $S_d$ can be adjusted as desired.

When the switch 252 is turned OFF, no current flows through the comparison circuit 253. At the time, the comparison circuit 253 does not work. Namely, the current mirror circuit of the transistors $M_{d51}$ and $M_{d52}$ is not work, and thereby generating no current. Therefore, when the clock signal CK is zero, the comparison circuit 253 consumes no current thereby saving power consumption. Incidentally, the determination circuit 250 can further include a data storage circuit such as a reset set flip-flop (RSFF) to reset the clock signal CK, so that the control signal $S_d$ is not changed depending on the clock signal CK.

Figure 6:
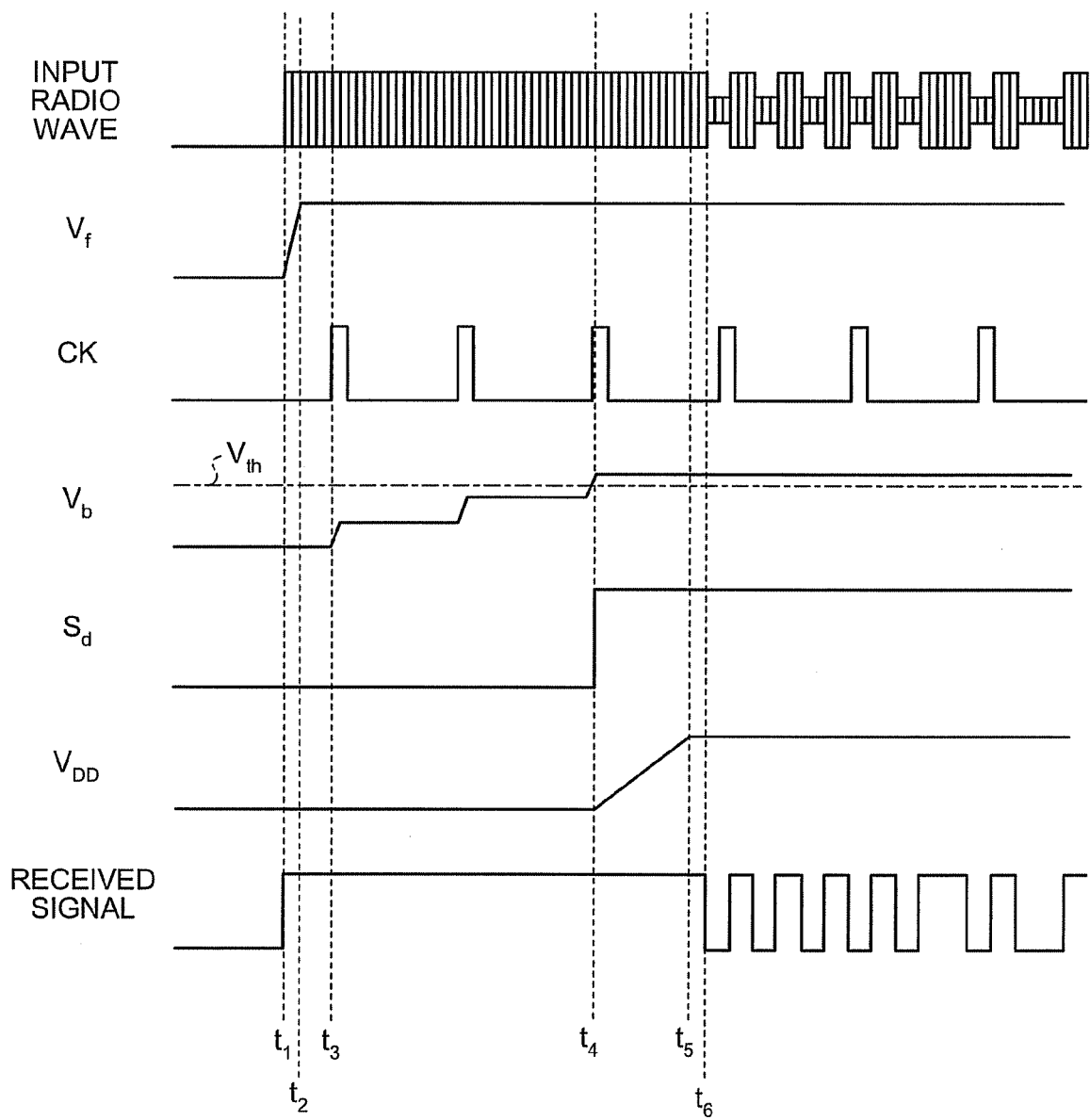
FIG. 6 is a timing chart of main signals transmitted through the rectifier circuit according to the second embodiment.

In FIG. 6, the description of the portions identical to those in FIG. 2 is omitted. "$S_d$" denotes the control signal $S_d$ output from the determination circuit 250.

Hereinafter, overall operation of the rectifier circuit 200 is explained with reference to FIG. 6. It is assumed that a radio wave is input to the rectifier circuit 200 for the first time via the antenna 10 at the timing t1. At this time, the rectifier circuit 200 is in the initial condition in the same manner as the rectifier circuit 100.

When the first rectifier circuit 110 receives a weak alternating-current signal, the smoothing capacitors $C_{11}$ and $C_{12}$ are charged. At the timing $t_2$, the direct-current voltage $V_f$ reaches a predetermined voltage level required for the pulse generating circuit 120 and the bias-voltage generating circuit 130. The pulse generating circuit 120 is driven by the direct-current voltage $V_f$ and generates the clock signal CK. The determination circuit 250 is also driven by the direct-current voltage $V_f$, and the bias voltage $V_b$ is being monitored.

A first pulse of the clock signal CK rises at the timing $t_3$. At the same timing, the switch 131 of the bias-voltage generating circuit 130 is turned ON. Then, the current source I1 that the direct-current voltage $V_f$ is input thereto starts supplying currents to a drain of the NMOS transistor $M_{20}$. After a plurality of pulses of the clock signal CK is input to the bias-voltage generating circuit 130, the determination circuit 250 determines that the bias voltage $V_b$ coincides with voltages of both ends of the capacitor $C_{61}$ at the timing $t_4$, and thereby outputting the control signal $S_d$ that indicates ON. Upon receiving the control signal $S_d$, the switch 241 is turned OFF. Then, the second rectifier circuit 240 is conducted to the earth terminal, i.e., the second rectifier circuit 240 starts working. The bias voltage $V_b$ reaches approximately equivalent to the threshold voltage, and the second rectifier circuit 240 becomes in the high-sensitive condition. From the timing $t_4$ onward, the smoothing capacitors $C_{41}$ and $C_{42}$ are rapidly charged. Then, a predetermined voltage level of the direct-current voltage $V_{DD}$ is output at the timing $t_5$. Namely, the second rectifier circuit 240 can be ready to generate the direct-current voltage $V_{DD}$ from weak radio waves directly.

Operational procedures of the rectifier circuit 200 after the predetermined direct-current voltage $V_{DD}$ is obtained are identical to that is described in the first embodiment.

As described above, in the rectifier circuit 200 according to the second embodiment, the alternating-current signal is not output to the second rectifier circuit 240 until the predetermined direct-current voltage $V_{DD}$ is obtained. Therefore, the first rectifier circuit 110 can rectify efficiently. Moreover, it is possible to shorten a time to cause the second rectifier circuit 240 to be in the high-sensitive condition.

Incidentally, the NMOS transistor is employed in the first and second embodiments, but a p-channel metal-oxide-semiconductor (PMOS) transistor is also applicable instead of the NMOS transistor. The source and the drain of the MOS transistor are just names allocated to differentiate two electrodes of a channel. Therefore, the source and the drain can be switched.

The first rectifier circuit 110 and the second rectifier circuits 140 and 240 are respectively composed by four MOS transistors in the first and second embodiments. However, the number of the MOS transistors is not limited to four. The number of the MOS transistors can be changed to, for example, two or more than four.

Figure 7:
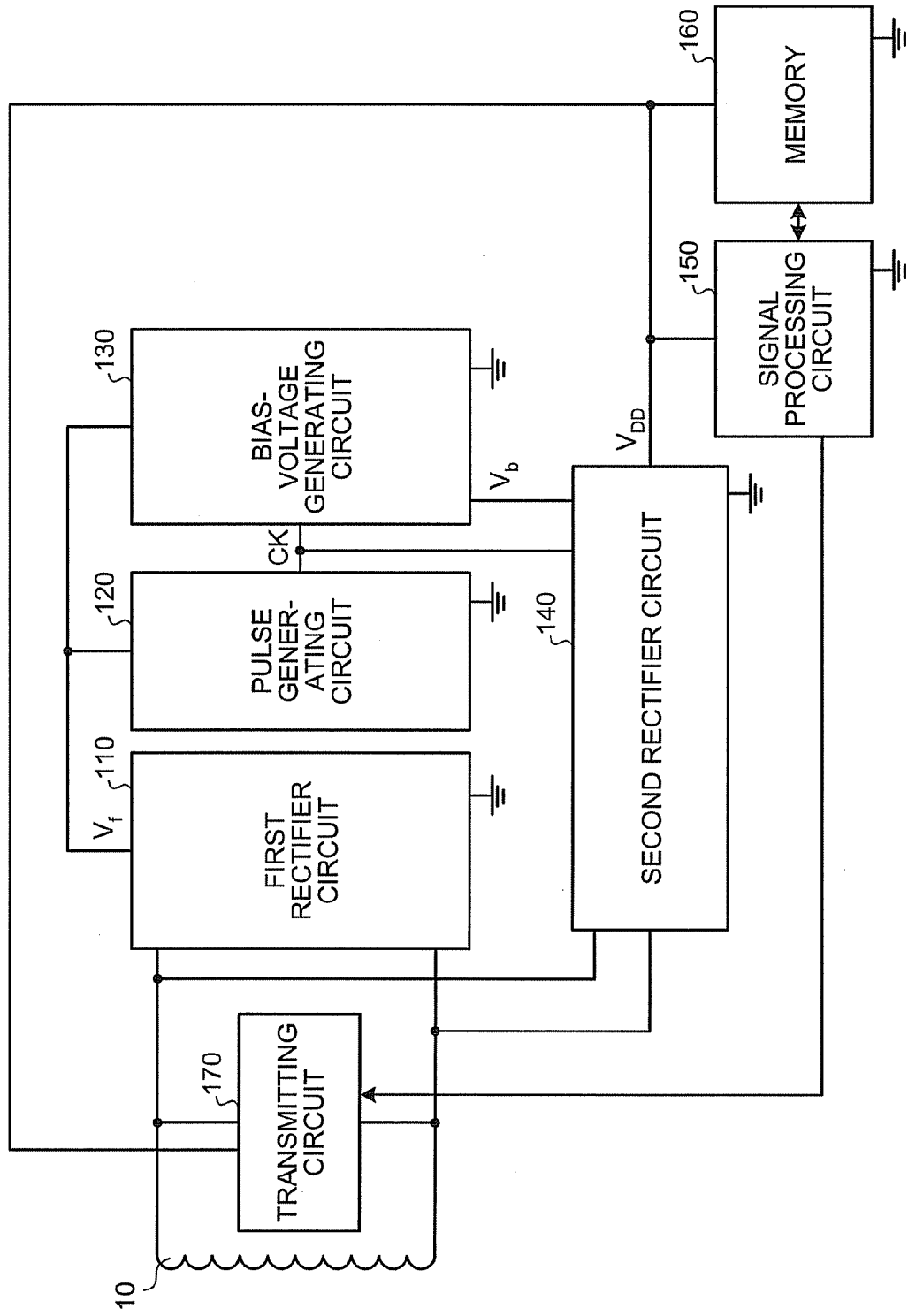
FIG. 7 is a block diagram of a radio communication device (RFID tag) according to a third embodiment of the present invention.

A radio communication device according to a third embodiment of the present invention is described below. The radio communication device includes the rectifier circuits according to the first and second embodiments. In the third embodiment, an RFID tag is cited as the radio communication device. In FIG. 7, the portions identical to those in FIG. 1 are denoted with the same reference numerals and the description of those portions is omitted.

The RFID tag shown in FIG. 7 includes the antenna 10, a signal processing circuit 150, a memory 160, and a transmitting circuit 170 in addition to the first rectifier circuit 110, the pulse generating circuit 120, the bias-voltage generating circuit 130, and the second rectifier circuit 140 that are components of the rectifier circuit 100 in the first embodiment. The second rectifier circuit 140 generates the direct-current voltage $V_{DD}$, and supplies the direct-current voltage $V_{DD}$ as a power supply voltage to the signal processing circuit 150, the memory 160, and the transmitting circuit 170. The direct-current voltage $V_{DD}$ includes the communication information that is transmitted from the reader/writer. Therefore, the signal processing circuit 150 processes the direct-current voltage $V_{DD}$ as a communication signal. The transmitting circuit 170 is connected to both ends of the antenna 10.

The antenna 10 induces an alternating-current signal on an antenna wire depending on a flux reversal caused by the reader/writer (not shown). The alternating-current signal is output to the first rectifier circuit 110 and the second rectifier circuit 140, and processed in the same manner as described in the first embodiment. The first rectifier circuit 110 rectifies the alternating-current signal that is induced by the antenna 10 even if the alternating-current signal is weak, for example, an effective value is less than 0.7V. Then, the second rectifier circuit 140 generates the direct-current voltage $V_{DD}$ that is used as the power supply voltage of the signal processing circuit 150, the memory 160, and the transmitting circuit 170. Incidentally, the communication information included in the alternating-current signal is demodulated by the signal processing circuit 150.

Based on the demodulated communication signal, the signal processing circuit 150 reads out data (for example, tag identifying information) from the memory 160, or writes data in the memory 160. The data read out from the memory 160 is transmitted to the reader/writer by the signal processing circuit 150 and the transmitting circuit 170. Specifically, the transmitting circuit 170 generates a demagnetizing field by modulating currents that flow through the antenna 10. The demagnetizing field causes a small change on currents that flow though an antenna of the reader/writer. The reader/writer detects the small change and determines as a data signal.

Figure 8:
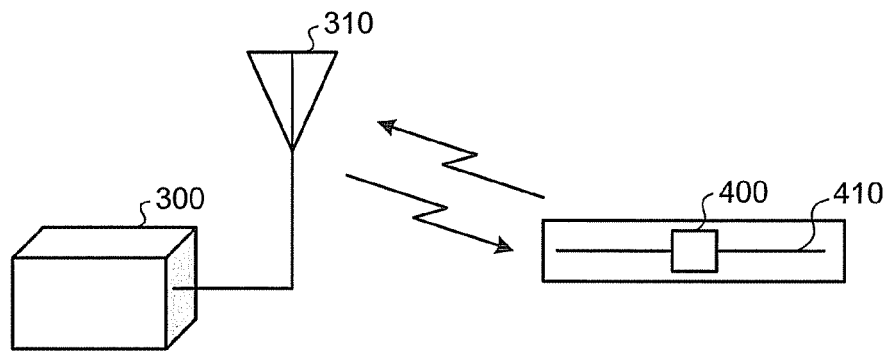
FIG. 8 is a schematic view of the RFID tag and a reader/writer.

As shown in FIG. 8, an RFID tag 400 corresponds to the RFID tag shown in FIG. 7. The RFID tag 400 includes an antenna 410 and an RFID chip. The antenna 410 corresponds to the antenna 10 shown in FIG. 7, and is arranged on a film-like substrate. The RFID chip is directly connected onto the substrate. The rectifier circuit 100, the signal processing circuit 150, the memory 160, and the transmitting circuit 170 are integrated in the RFID chip. The reader/writer 300 includes a radio communication circuit, a signal processing circuit, and an antenna 310. The reader/writer 300 transmits a radio signal via the antenna 310, or receives a radio signal by detecting a demagnetizing field generated in the antenna 410.

The electric power of the radio signal between the reader/writer 300 and the RFID tag 400 is inversely proportional to the square of the distance between the reader/writer 300 and the RFID tag 400. Accordingly, in the conventional RFID tag, communication can not be established if the distance is longer than a few meters. However, in the rectifier circuit according to the first and second embodiments, communication can be established even if the distance is longer.

Figure 9:
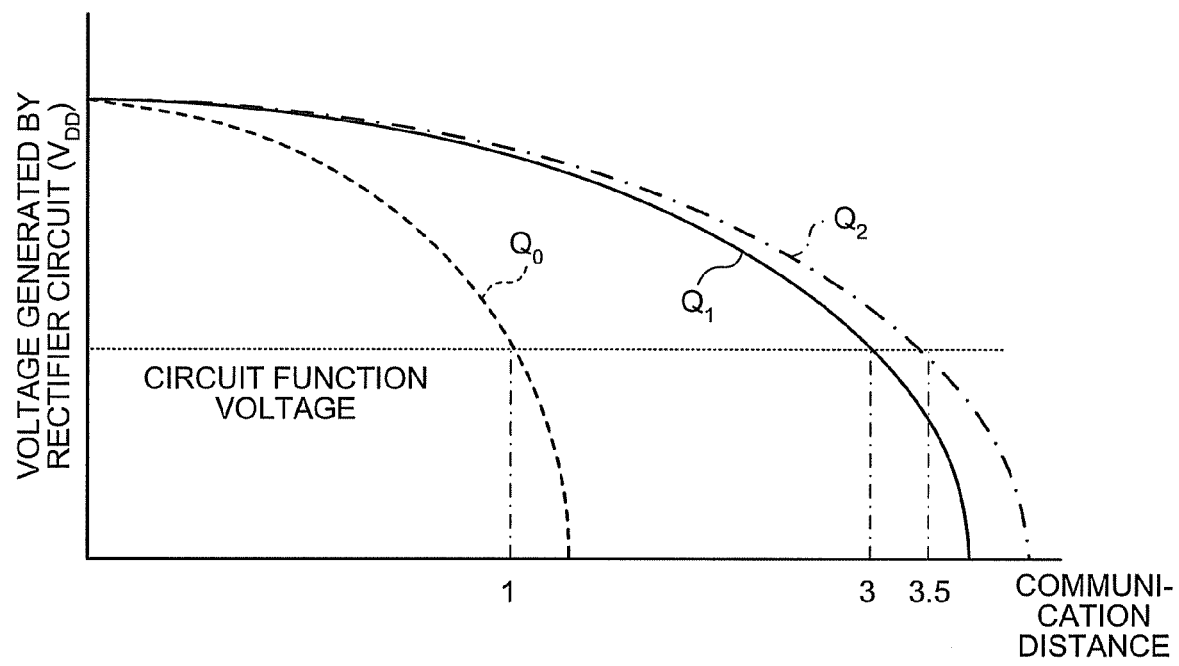
FIG. 9 is a graph of an experimental result showing a relationship between a communication distance between the RFID tag and the reader/writer and a voltage generated by a rectifier circuit included in the RFID tag.

In the graph of FIG. 9, the line $Q_0$ denotes a result of an experiment performed using the conventional RFID tag, the line $Q_1$ denotes a result of an experiment performed using the RFID tag including the rectifier circuit 100 according to the first embodiment, and the line $Q_2$ denotes a result of an experiment performed using the RFID tag including the rectifier circuit 200 according to the second embodiment.

When the distance is short, the conventional rectifier circuit and the rectifier circuits of the first and second embodiments generate almost equal voltages. When the distance is longer, however, the generated voltages are different. When the voltage drops below a certain threshold, a signal processing circuit of the RFID tag can not function. The threshold is indicated by a dotted line as a circuit function voltage in FIG. 9. If the communication distance for the conventional RFID tag is 1, i.e., the intersection of the line $Q_0$ and the line of circuit function voltage denotes as 1, the communication distance for the RFID tag including the rectifier circuit 100 is 3 times of the same for the conventional RFID tag, and the communication distance for the RFID tag including the rectifier circuit 200 is 3.5 times of the same for the conventional RFID tag. From the results of the experiments, in the rectifier circuit according to the first and second embodiments, communication can be established even if the distance between the RFID tag and the reader/writer is longer. The rectifier circuit 200 can establish communication in the longer distance compared with the rectifier circuit 100. This is because the alternating-current signal induced by the antenna 10 can be supplied to the first rectifier circuit 110 high-efficiently in the rectifier circuit 200. In other words, the rectifier circuit 200 can rectify the weak alternating-current signal compared with the rectifier circuit 100.

As described above, the RFID tag according to the third embodiment includes the rectifier circuit according to the first or second embodiment. Therefore, communication can be established even if the distance between the RFID tag and the reader/writer is longer.

The rectifier circuit according to the first or second embodiment needs not include an external power source such as a battery. Furthermore, the rectifier circuit can stably generate an enough level of the direct-current voltage by rectifying an alternating-current signal, even if an effective value of the alternating-current signal is below the threshold voltage of the MOS transistor included in the rectifying unit. Furthermore, the rectifier circuit can minimize not only its size but also the production cost because it is not necessary to include the external power source and a capacity for the external power source.

The radio communication device according to the third embodiment can establish communication with the base station located in a longer distance compared with the conventional radio communication device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rectifier circuit comprising:
    an input terminal that receives an alternating-current signal;
    a first rectifier circuit that generates a first direct-current voltage from the alternating-current signal;
    a bias-voltage generating circuit that generates a bias voltage from the first direct-current voltage; and
    a second rectifier circuit that generates a second direct-current voltage from the alternating-current signal biased with the bias voltage, wherein the second rectifier circuit includes a metal-oxide-semiconductor (MOS) transistor, the bias voltage being applied to a gate of the MOS transistor, the alternating-current signal being input to a drain of the MOS transistor.

2. The circuit according to claim 1, further comprising a pulse generating circuit that is driven by the first direct-current voltage and generates a pulse signal, wherein
    the second rectifier circuit includes a capacitor that is connected to between the gate and the drain of the MOS transistor, and
    the bias voltage is intermittently applied to the capacitor depending on the pulse signal.

3. The circuit according to claim 1, further comprising a pulse generating circuit that is driven by the first direct-current voltage and generates a pulse signal, wherein
    the bias-voltage generating circuit includes a MOS transistor in which a gate and a drain are short-circuited and a current source that generates a direct current from the first direct-current voltage, and intermittently supplies the direct current to the drain depending on the pulse signal, and outputs a voltage between a source and the drain of the MOS transistor as the bias voltage.

4. The circuit according to claim 1, further comprising a pulse generating circuit that is driven by the first direct-current voltage and generates a pulse signal, wherein
    the second rectifier circuit includes a first MOS transistor, the bias voltage being applied to a gate of the first MOS transistor, the alternating-current signal being input to a drain of the first MOS transistor, and
    the bias-voltage generating circuit includes a second MOS transistor that is designed in the same manner as the first MOS transistor, a gate and a drain of the second MOS transistor being short-circuited.

5. The circuit according to claim 2, further comprising a determining circuit that outputs an ON signal when the bias voltage coincides with a voltage between both ends of the capacitor, wherein
    the second rectifier circuit includes a switch that is turned ON to drive the second rectifier circuit only when receiving the ON signal.

6. The circuit according to claim 1, wherein the first rectifier circuit includes a MOS transistor that rectifies the alternating-current signal, a threshold voltage of the MOS transistor in the first rectifier circuit being lower than a threshold voltage of the MOS transistor in the second rectifier circuit.

* * * * *